(12) United States Patent
Song et al.

(10) Patent No.: US 11,925,969 B2
(45) Date of Patent: Mar. 12, 2024

(54) ORTHODONTIC WIRE BENDING DEVICE

(71) Applicant: KOREA INSTITUTE OF MACHINERY & MATERIALS, Daejeon (KR)

(72) Inventors: Joonyub Song, Daejeon (KR); Yongjin Kim, Daejeon (KR); Youn Ho Jung, Seoul (KR); Kwang Sun Choi, Seoul (KR); Jae-hak Lee, Sejong (KR); Seung Man Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 624 days.

(21) Appl. No.: 15/734,815

(22) PCT Filed: Jun. 3, 2019

(86) PCT No.: PCT/KR2019/006665
§ 371 (c)(1),
(2) Date: Dec. 3, 2020

(87) PCT Pub. No.: WO2019/235796
PCT Pub. Date: Dec. 12, 2019

(65) Prior Publication Data
US 2021/0229158 A1 Jul. 29, 2021

(30) Foreign Application Priority Data

Jun. 4, 2018 (KR) .................. 10-2018-0064274
Sep. 13, 2018 (KR) .................. 10-2018-0109776

(51) Int. Cl.
*B21F 1/00* (2006.01)
*A61C 7/02* (2006.01)

(52) U.S. Cl.
CPC ............. *B21F 1/004* (2013.01); *A61C 7/02* (2013.01)

(58) Field of Classification Search
CPC .. B21F 1/00; B21F 1/004; B21F 1/006; B21F 23/00; B21D 7/02; B21D 7/024; A61C 7/02
(Continued)

(56) References Cited

U.S. PATENT DOCUMENTS 3,680,347 A * 8/1972 Schenck ................ B21D 7/024
72/217
3,728,888 A * 4/1973 Motzer ................... B21F 11/00
72/325

(Continued)

FOREIGN PATENT DOCUMENTS

JP      S48-20918 U    3/1973
JP      2002-143962 A  5/2002
(Continued)

OTHER PUBLICATIONS

KR 101829324B1, Jung et al. Feb. 2018.*
(Continued)

*Primary Examiner* — Edward T Tolan
(74) *Attorney, Agent, or Firm* — Hauptman Ham, LLP

(57) ABSTRACT

An orthodontic wire bending device includes a providing part, a bending unit and a cutting part. The providing part is configured to provide a wire. The bending unit is disposed at a front side of the providing part, and includes a fixing part and a bending part. The fixing part is configured to fix the wire. The bending part is configured to bend the wire fixed by the fixing part. The cutting part is configured to cut the wire bent by the bending part. The bending part includes a bending module, and the bending module is rotated along a circumferential direction or moves along a direction to make (Continued)

contact with at least one side of the wire for bending the wire.

20 Claims, 14 Drawing Sheets

(58) Field of Classification Search
USPC .......................................................... 72/388
See application file for complete search history.

(56) References Cited

U.S. PATENT DOCUMENTS

| | | | | |
|---|---|---|---|---|
| 4,335,758 | A | 6/1982 | Williams | |
| 5,285,669 | A * | 2/1994 | Itaya .......................... | B21F 3/02 |
| | | | | 140/140 |
| 6,612,143 | B1 | 9/2003 | Butscher et al. | |
| 7,188,504 | B2 * | 3/2007 | Latour .................... | B21F 1/006 |
| | | | | 72/217 |
| 8,561,449 | B2 * | 10/2013 | Veit ........................ | B21D 11/12 |
| | | | | 72/157 |
| 9,067,255 | B2 * | 6/2015 | Fries ......................... | B21F 1/00 |
| 10,953,448 | B2 * | 3/2021 | Lan .......................... | B21D 7/14 |
| 11,007,563 | B2 * | 5/2021 | Suto .......................... | B21F 1/00 |
| 2015/0068267 | A1 * | 3/2015 | Winton, III ............ | B21D 7/024 |
| | | | | 72/338 |
| 2016/0114377 | A1 | 4/2016 | Riemeier et al. | |

FOREIGN PATENT DOCUMENTS

| | | |
|---|---|---|
| JP | 2002-248115 A | 9/2002 |
| JP | 5512858 B2 | 6/2014 |
| KR | 10-1489324 B1 | 2/2015 |
| KR | 10-1629136 B1 | 6/2016 |
| KR | 10-1643504 B1 | 7/2016 |
| KR | 10-1678312 B1 | 11/2016 |
| KR | 10-1877514 B1 | 7/2018 |

OTHER PUBLICATIONS

Translation JP 2002-143962A, Takahashi et al. May 2002.*
CN 104607508A, Zhang May 2015.*
CN 104307942A, Wu et al. Jan. 2015.*
KR 101489324B1, Sueng Hitech Feb. 2015.*
International Search Report dated Sep. 10, 2019, corresponding to International Application No. PCT/KR2019/006665.
Korean Notice of Allowance dated Nov. 12, 2019, in connection with the corresponding Korean Patent Application No. 10-2018-0064274.
Japanese Office Action dated Dec. 14, 2021 in connection with the Japanese Patent Application No. 2020-567576.

* cited by examiner

ORTHODONTIC WIRE BENDING DEVICE

CROSS REFERENCE TO RELATED APPLICATION

This present application is a national stage filing under 35 U.S.C § 371 of PCT application number PCT/KR2019/006665 filed on Jun. 3, 2019, which designates the United States and was published in Korean, and which claims priority to Korean Patent Application Nos. 10-2018-0064274 filed on Jun. 4, 2018 and 10-2018-0109776 filed on Sep. 13, 2018 in the Korean Patent Office. The disclosures of the above-listed applications are hereby incorporated by reference herein in their entireties.

BACKGROUND

1. Field of Disclosure

The present disclosure of invention relates to an orthodontic wire bending device, and more specifically the present disclosure of invention relates to an orthodontic wire bending device, capable of increasing a fixing force of a wire in bending or cutting an orthodontic wire, manufacturing the wire more correctly and easily with a various kinds of shapes, and increasing structural stability and productivity.

2. Description of Related Technology

A dental treatment means protecting, diagnosing and treating a disease or an abnormal state of an oral and maxillofacial areas including teeth, tissues and an oral cavity.

Recently, an orthodontic treatment is widely performed for improving teeth conditions and maintaining healthy teeth, in addition to the dental treatment. In the orthodontic treatment, the teeth are rearranged, and various kinds of skeleton troubles are corrected to remove the problems, so that healthy oral cavity and beautiful face skeleton may be obtained.

In the orthodontic treatment, an orthodontic wire is normally used. Here, a correct orthodontic wire should be manufactured according to an arrangement of teeth, a shape of teeth and so on, to decrease the period of the orthodontic treatment and to improve the treating effect. Thus, for the success of the orthodontic treatment, the orthodontic wire should be manufactured precisely and correctly, to be matched to the oral cavity of each patient.

The orthodontic wire is normally manufactured by a dentist or a dental technician manually, based on a mold or a pattern of the oral cavity including the teeth.

In manufacturing the orthodontic wire manually, the quality of the orthodontic wire depends on proficiency of the dentist or the dental technician, and manufacturing cost and time may be increased, so that the cost price for the orthodontic treatment may be increased.

Recently, U.S. Pat. No. 6,612,143 discloses that the orthodontic wire is bent by a bending robot based on a 3D modeling which is performed based on a 3D image for the oral cavity including the teeth.

However, the bending robot has a complex structure and mechanism, and the bending robot is too expensive, so that the manufacturing the orthodontic wire using the bending robot is not easy and too expensive.

Thus, a bending apparatus having a relatively simple structure and mechanism is necessary for decreasing the cost price for manufacturing the orthodontic wire.

Related prior art is U.S. Pat. No. 6,612,143 and KR patent No. 10-1877514.

SUMMARY

The present invention is developed to solve the above-mentioned problems of the related arts. The present invention provides an orthodontic wire bending device, capable of increasing a fixing force of a wire in bending or cutting an orthodontic wire, manufacturing the wire more correctly and easily with a various kinds of shapes, and increasing structural stability and productivity.

According to an example embodiment, an orthodontic wire bending device includes a providing part, a bending unit and a cutting part. The providing part is configured to provide a wire. The bending unit is disposed at a front side of the providing part, and includes a fixing part and a bending part. The fixing part is configured to fix the wire. The bending part is configured to bend the wire fixed by the fixing part. The cutting part is configured to cut the wire bent by the bending part. The bending part includes a bending module, and the bending module is rotated along a circumferential direction or moves along a direction to make contact with at least one side of the wire for bending the wire.

In an example, the providing part may include at least one providing unit having a plurality of guide rollers, and the guide rollers guide a moving of the wire.

In an example, a guiding groove may be formed at each of the guide rollers to guide the wire, and the guiding groove may be formed to be concaved along a circumferential direction of each of the guide rollers.

In an example, the providing part may include a belt and a driving roller. The belt may be driven in the guiding rollers, and provide a driving force to the guiding rollers. The driving roller may be configured to provide a driving force to the belt.

In an example, the providing part may include a first fixing unit configured to fix the wire, and a guide unit in which the first fixing unit is slid. The wire may be provided according to the sliding of the first fixing unit.

In an example, the providing part may further include a second fixing unit disposed at a rear side of the first fixing unit, to position the wire from outside to a predetermined position, and a guide frame configured to fix the guide unit.

In an example, the second fixing unit may include a rotating part configured to move the wire from the predetermined position toward the first fixing unit.

In an example, the cutting part may include a cutter disposed at a front side or a rear side of the fixing part and have at least one cutting blade.

In an example, the cutting blade may be a triple blade cutting the wire from three directions at the same time, or a double blade cutting the wire from two directions at the same time.

In an example, the cutting part may further include a wheel having saw teeth formed at an inner surface of the wheel, and a cutting driving part configured to rotate the wheel. The cutting part may rotate along the inner surface of the wheel to cut the wire.

In an example, the cutting part may irradiate a laser to the wire to cut the wire.

In an example, the bending device may further include a linear moving part having a combining member connected to the cutting part, to move the cutting part toward the wire. The combining member may be connected to the cutting part along a diagonal direction, and the cutting part may move toward the wire along the diagonal direction.

In an example, the bending device may further include a guide jig part having an upper jig and a lower jig. The upper jig and the lower jig may overlap with each other by a predetermined gap, and the wire bent by the bending unit may be fixed and extend between the upper jig and the lower jig.

In an example, a guide groove may be formed at the upper jig and the lower jig, and the bending unit and the cutter of the cutting part may be disposed at the guide groove.

In an example, the lower jig may include a first lower plate and a second lower plate detachably combined with each other with respect to a boundary surface. The first lower plate may rotate with respect to the second lower plate, to move the wire fixed between the upper jig and the lower jig downwardly.

In an example, the upper jig may have a transparent material, and a vision part may be disposed over the upper jig to monitor the wire through the upper jig.

In an example, the fixing part may include a fixing jig configured to fix the wire, and at least a pair of fixing tips arranged in a line to fix the wire when the wire passes through and is discharged from the fixing jig.

In an example, the fixing part may further include a guide pin disposed under the wire, extending a direction substantially perpendicular to a discharged direction of the wire, and making contact with the wire.

In an example, the bending part may include a base and a bending bar. The bending bar may be protruded from the base and may be positioned at both sides of the wire for bending the wire. The bending bar may be selectively disposed at one of both sides of the wire, via a z-motion.

In an example, the bending bar may move forward or backward along a wire advancing direction, to change a rotational center of the wire.

According to the present example embodiments, at least one providing unit of the providing part is arranged in a line, to move the wire intermittently along a longitudinal direction by a predetermined distance, so that the wire may be moved uniformly in a line.

In addition, the guiding groove is formed around the guide roller and the wire is mounted at the guiding groove, so that the wire may be moved stably and safely with maintaining the position of the wire.

Alternatively, the guide roller may move the wire by a driving force from the belt, so that the wire may be stably provided with a relatively simple driving mechanism.

Further, as the wire is provided with the first fixing unit sliding in the guide unit, a relatively longer wire may be stably provided. Here, the wire from outside is stably mounted by the second fixing unit at the predetermined position, and thus the position of the wire is correctly maintained and thus the wire may be continuously provided without any problem.

In addition, when the cutter of the cutting part has a triple blade, the wire may be cut from three directions at the same time, so that the wire receives a cutting force uniformly from three directions. Thus, the wire may be arranged or positioned more uniformly and be cut more precisely and more correctly, compared to the case that one directional cutting force is applied to the wire.

Alternatively, when the cutter has a double blade, the double blade heading the wire extends along the same direction, so that the gap between the blades may be minimized and a cutting surface of the wire may be more smoothly.

Here, the cutting part is designed so as to drive the cutter as the driving of the wheel, so that each blade of the triple blade or the double blade receives the cutting force uniformly. Thus, the wire may be cut more stably and smoothly.

Alternatively, when the laser is used for the cutting, the wire may be cute more precisely and more correctly.

Alternatively, the cutting part and the linear moving part are combined with each other, to move the cutting part by the linear moving part, so that the cutting part moves toward the wire for the wire cutting and the cutting part moves away from the wire after the cutting. Thus, the following bending process may not be interfered by the cutting part.

In addition, the upper jig and the lower jig overlapping with each other with a predetermined gap, are disposed, so that the bended portion of the wire may be fixed between the upper jig and the lower jig. Thus, during the wire bending process, the wire is prevented from sagging downwardly, and the wire is maintained to be bended stably.

In addition, the lower jig includes the first and second lower plates rotatably combined with each other, and thus the first lower plate is rotated with respect to the second lower plate after the bending, to move the wire downwardly.

Further, the upper jig has a transparent material and the lower jig has an opaque material, so that the bended wire extending between the upper and lower jigs is recognized by a naked eye. Thus, the moving or the bending of the wire may be easily controlled.

Figure 1:
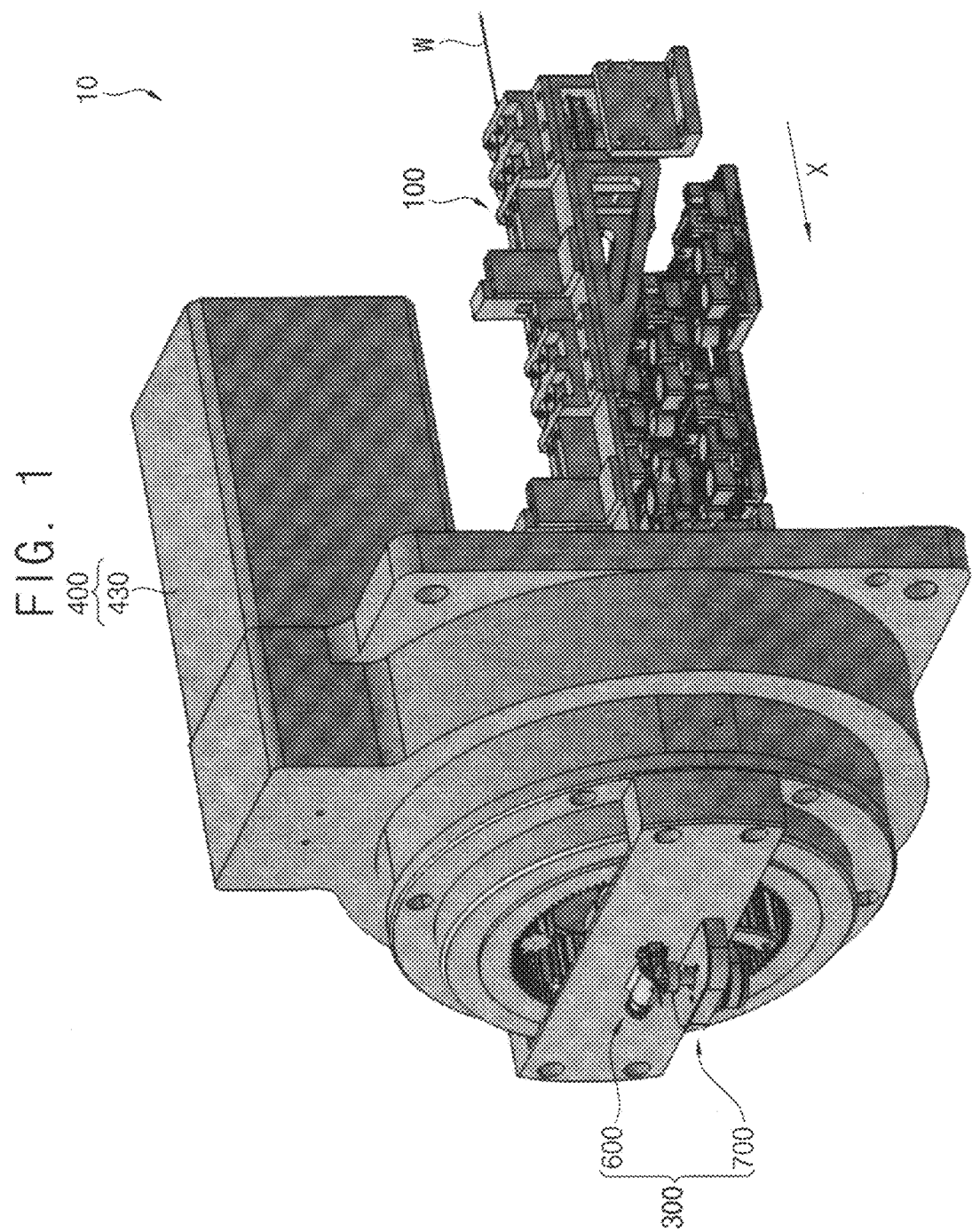
FIG. 1 is a perspective view illustrating an orthodontic wire bending device according to an example embodiment of the present invention.

| * Reference numerals | |
|---|---|
| 10, 20: bending device | 100, 101, 111, 170: providing part |
| 110, 172: guide roller | 300, 370: bending unit |
| 400, 401: cutting part | 420, 473: cutter |
| 430: cutting driving part | 480: linear moving part |
| 483: combining member | 600: fixing part |
| 380, 700: bending part | 702: bending module |
| 870: guide jig part | 880: upper jig |
| 890: lower jig | 891: first lower plate |
| 892: second lower plate | 970: vision part |
| w: wire | |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention is described more fully hereinafter with reference to the accompanying drawings, in which embodiments of the invention are shown.

Figure 2:
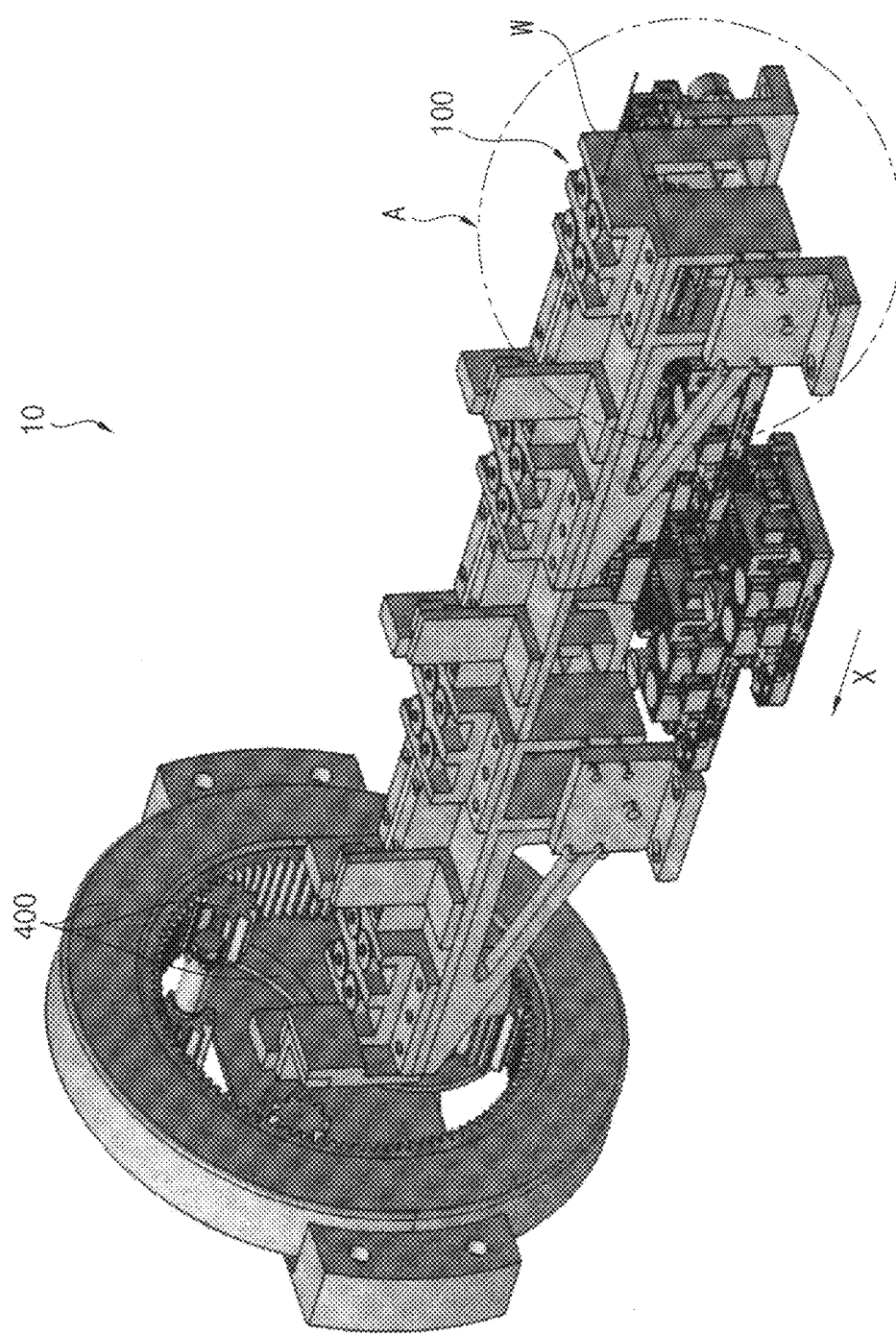
FIG. 2 is a perspective view illustrating an inside of the bending device of FIG. 1, except for a cutting driving part.
Figure 3:
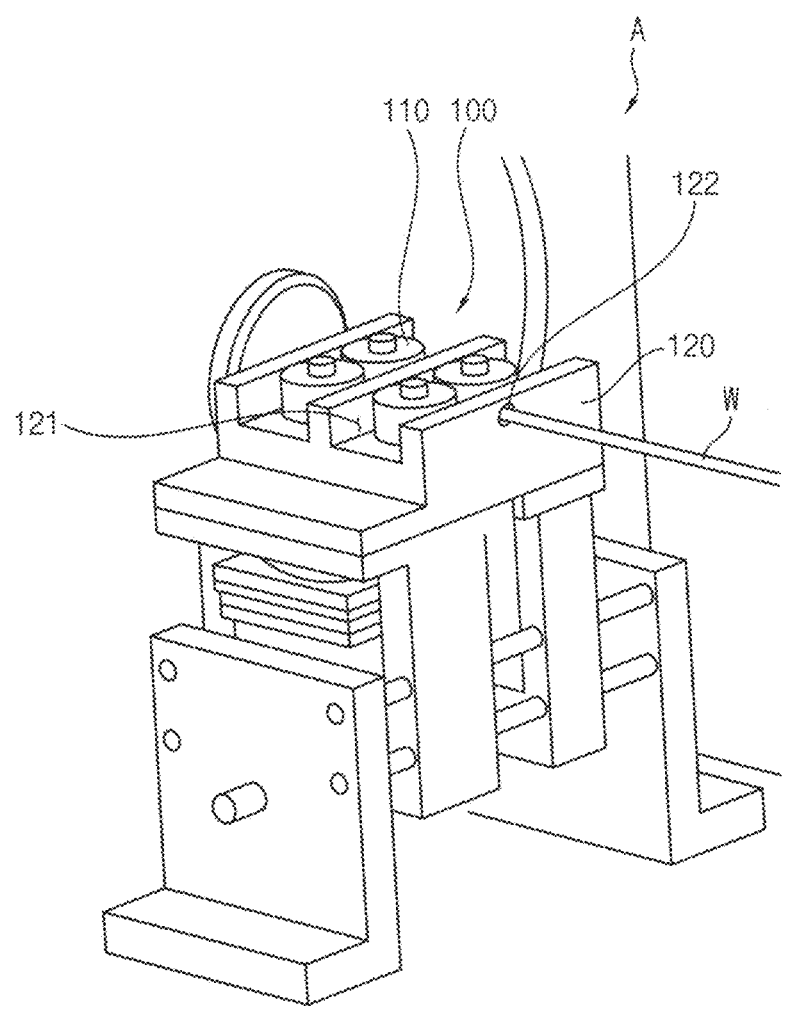
FIG. 3 is an enlarged view of a portion A of the bending device of FIG. 2.

FIG. 1 is a perspective view illustrating an orthodontic wire bending device according to an example embodiment of the present invention. FIG. 2 is a perspective view illustrating an inside of the bending device of FIG. 1, except for a cutting driving part. FIG. 3 is an enlarged view of a portion A of the bending device of FIG. 2.

Referring to FIG. 1 and FIG. 2, the orthodontic wire bending device 10 (hereinafter, bending device) according to the present example embodiment includes a providing part 100, a bending unit 300, a cutting part 400 and a sensing part (not shown), and the bending unit 300 includes a fixing part 600 and a bending part 700.

In the present example embodiment, the wire w is provided by the providing part 100, and then the fixing part 600 disposed at a front side of the providing part 100 fixes the wire w. Then, when the wire w is necessary to be bended, the bending part 700 bends the wire w, and when the wire w is necessary to be cut, the cutting part 400 cuts the wire w.

Referring to FIG. 2 and FIG. 3, the providing part 100 includes at least one providing units connected with each other, and when the plurality of providing units is connected with each other, the providing units are arranged along a moving pass of the wire w in a line. Thus, the providing part 100 moves the wire w intermittently, in other words a step moving, along a direction (an X direction), by a predetermined distance. Alternatively, the providing part 100 may move the wire w continuously considering the bending or the cutting.

Here, although not shown in the figure, the providing part 100 has a taper shape formed at an initial position of the providing part 100 into which the wire w is inserted, so that the wire w may be inserted into the providing part 100 more easily.

Each of the providing units of the providing part 100 includes a plurality of guide rollers 110, and a bracket 120. The guide rollers 110 guide the wire w along the X direction. The bracket 120 has a plurality of inserting grooves 121, and thus the guide roller 110 are inserted or positioned at the inserting grooves 121.

Here, at least two guide rollers 110 are inserted into the inserting grooves 121 of the bracket 120 in a pair, and the guide rollers 110 are rotated by an additional motor (not shown), so that the pair of the guide rollers 110 rotates with disposing the wire therebetween so as to guide or move the wire w.

Accordingly, the wire w passes through a through hole 122 formed through the bracket 120, and is guided by at least two guide rollers 110 rotating with making contact with each other, along the X direction.

Here, when the pair of guide rollers 110 is equipped, the guide rollers 110 are disposed at one inserting groove 121 and rotate with making contact with each other, so that the wire w is guided between the pair of guide rollers 110.

Alternatively, when two pair of guide rollers 110 is equipped, a first two guide rollers are disposed at a first inserting groove 121 and a second two guide rollers are disposed at a second inserting groove 121 as illustrated in FIG. 3, and thus the wire w is guided firstly between the first two guide rollers and then is guided between the second two guide rollers. Here, the first two guide rollers make contact with each other and rotate together, and the second two guide rollers make contact with each other and rotate together.

Here, the number of the guide rollers and the arrangement of the guide rollers may be variously changed.

As in the present example embodiment, the guide rollers 110 are pre-positioned at the inserting grooves 121 of the bracket 120, so that the guide rollers 110 are not necessary to be arranged at every guiding for the wire w to maintain the guiding direction of the wire w in the X direction. Thus, the wire may be uniformly guided or moved along the X direction, with the guide rollers 110 merely disposed or positioned at the pre-formed or pre-positioned inserting grooves 121.

A guiding groove (not shown) is formed at each of the guide rollers 110 to guide the wire w, and the guiding groove is formed to be concaved along a circumferential direction of each of the guide rollers 110. Thus, the wire w is mounted at the guiding grooves and is stably and correctly guided along the direction.

Referring to FIG. 2, the brackets 120 of each of the providing units of the providing part 110 are arranged in a line along the X direction, and thus the wire w moving along the brackets 120 maintains a line easily. Thus, the wire extends relatively longer with maintaining the arrangement of the wire w, so that the manufacturing for the wire w may be continuously and correctly performed by the bending unit 300 and the cutting part 400. Thus, the productivity may be increased.

The cutting part 400 includes a cutting driving part 430, and the cutting driving part 430 rotates the wheel 410 to cut the wire w.

Here, as illustrated in FIG. 1, the cutting driving part 430 is a wide rotating motor and is necessary for a 3D (dimension) bending of the wire w, in addition to the cutting the wire w. Here, the 3D bending means that the wire has a 3D shape after the bending, and in the present example embodiment, the cutting driving part 430 rotates with the wide rotating, and thus the cutting part 400 is widely rotated for the 3D bending of the wire w.

Here, the cutting driving part 430 may be removed, and thus the cutting part 400 is not rotated widely in a whole, and the bending for the wire w may be performed with a 2D bending. Thus, the wire may have a 2D shape after the bending.

Figure 4:
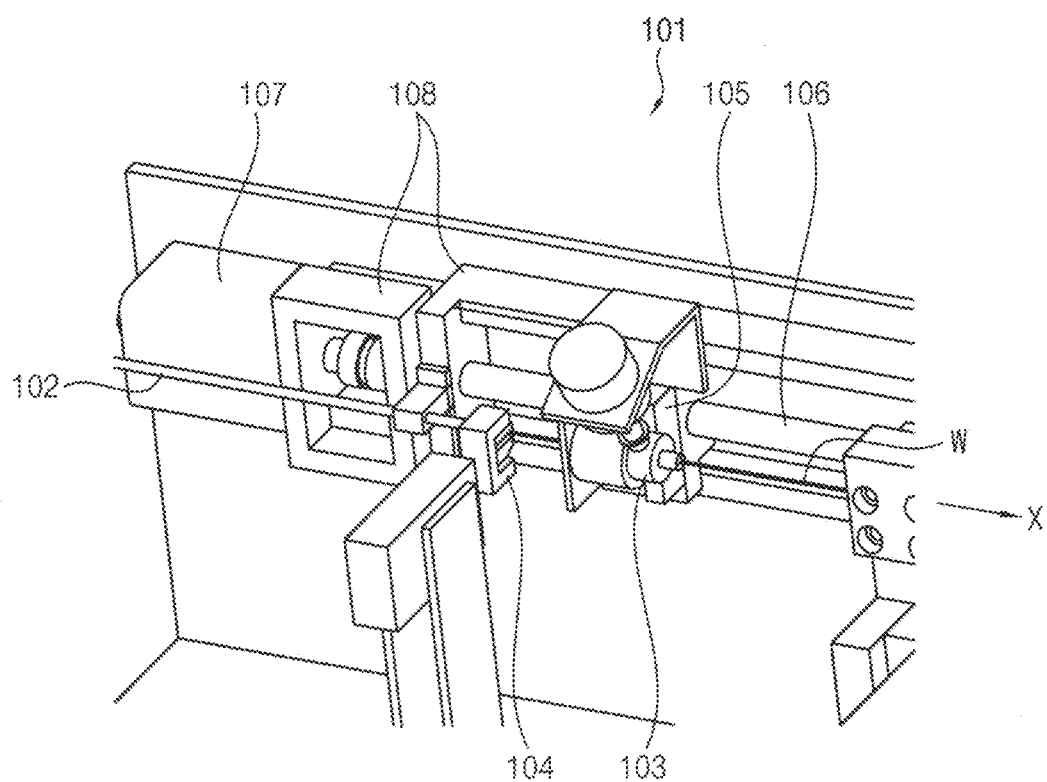
FIG. 4 is a perspective view illustrating an example of a providing part of the bending device of FIG. 2.

FIG. 4 is a perspective view illustrating an example of a providing part of the bending device of FIG. 2.

The bending device 10 may include a providing part 101 with a different structure.

Referring to FIG. 4, the providing part 101 may include a wire cover 102, first and second fixing units 103 and 104, a connecting unit 105, a guide unit 106, a guide driving part 107 and a guide frame 108.

The wire w is delivered and discharged by the wire cover 102, and the discharged wire w is firstly fixed by the second fixing unit 104. Here, the second fixing unit 104 may fix the wire w at both sides of the wire. For example, the second fixing unit 104 makes contact with the wire from an upper side and a lower side of the wire and fixes the wire w. The second fixing unit 104 is released from the wire and merely prevents the wire w to be bended or deviated from a predetermined position. The second fixing unit 104 merely fixes the wire w when the wire is not moved.

In addition, the first fixing unit 103 is disposed at a front side of the second fixing unit 104, along an advancing or moving direction of the wire w (+X direction), and the first fixing unit 103 fixes the wire w additionally.

Here, the first fixing unit 103 approaches the wire w along three directions, and thus fixes the wire w with three fixing points. As the wire w moves, the first fixing unit 103 moves with the wire, along the +X direction.

The first fixing unit 103 is connected to the guide unit 106 via the connecting unit 105, and the connecting unit 105 slides along an extending direction (X) of the guide unit 106 on the guide unit 106.

Here, the guide driving part 107 is configured for the sliding driving of the connecting unit 105 on the guide unit 106. The guide frame 108 may be fixed to a side of the guide unit 106, to fix the guide driving part 107 and the guide unit 106. Thus, the guide unit 106 is fixed to the guide frame 108, and extends along the X direction.

Thus, the first fixing unit 103 slides on the guide unit 106 with the connecting unit 105, and here, the wire w is fixed to the first fixing unit 103, so that the wire w also moves in parallel along the extending direction of the guide unit 106.

Accordingly, the wire w is guided along the X direction.

Figure 5:
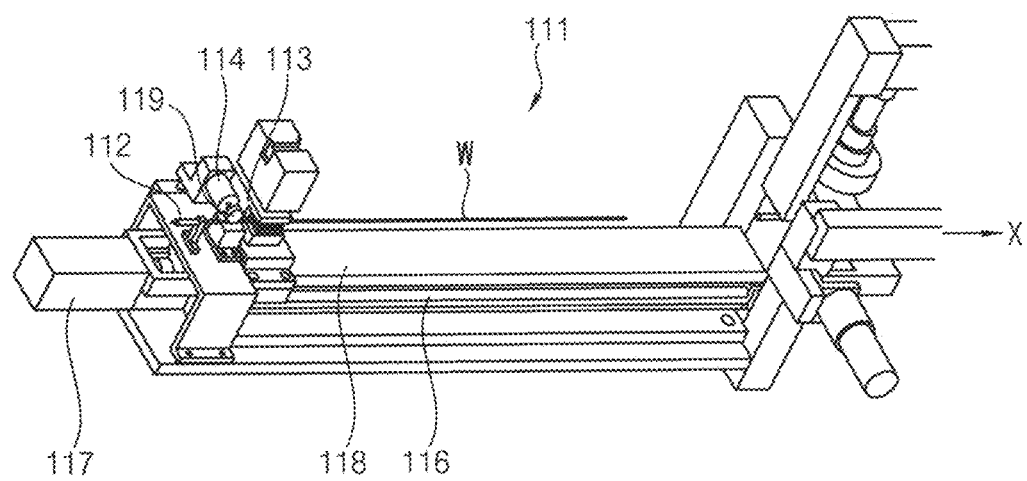
FIG. 5 is a perspective view illustrating another example of a providing part of the bending device of FIG. 2.

FIG. 5 is a perspective view illustrating another example of a providing part of the bending device of FIG. 2.

The bending device 10 may include a providing part 111 with another different structure.

Referring to FIG. 5, the providing part 111 includes an inlet unit 112, first and second fixing units 113 and 114, a guide unit 116, a guide driving part 117 and a guide frame 118.

Here, the wire w is provided via the inlet unit 112, and the inlet unit 112 has a pathway through which the wire passes through. In addition, the wire w may be provided to the inlet unit 112, by an operator or by an additional unit.

Then, the wire w moves with fixed by the second fixing unit 114. Here, a rotating part 119 is disposed at an end of the second fixing unit 114. As illustrated in the figure, the rotating part 119 may have a circular plate shape and rotate, and thus when the wire w is provided to the rotating part 119, the wire w is provided to the first fixing unit 113 by the rotating part 119. Here, the first fixing unit 113 is disposed at a front side of the rotating part 119 along the +X direction.

Here, the second fixing unit 114 fixes and positions the wire w to be positioned and moved along the X direction via the rotating part 119.

For example, when the wire w is provided, the rotating part 119 moves upwardly to form a space in which the wire w is inserted, and when the wire w is inserted into rotating part 119, the rotating part 119 moves downwardly to make contact with the wire w. Thus, as the rotating part 119 rotates, the wire w moves toward the first fixing unit 113.

Accordingly, the wire w moving with fixed with the second fixing unit 114 is then fixed by the first fixing unit 113. In the present example embodiment, the first fixing unit 113 approaches the wire w from an upper side and a lower side at the same time, to fix the wire w. Here, the fixing shape or the fixing structure for the wire w may be variously designed. Thus, the wire is fixed by the first fixing unit 113, and as the wire w moves, the first fixing unit 113 moves forwardly along the +X direction.

Here, the first fixing unit 113 slides along the extending direction X of the guide unit 116 on the guide unit 116.

The guide driving part 117 is configured for the sliding driving of the first fixing unit 113 on the guide unit 116, and thus the first fixing unit 113 slides along the guide unit 116. Thus, the wire w fixed to the first fixing unit 13 is also moved forwardly.

The guide frame 118 extends along the X direction, and the guide unit 116 is fixed along the guide frame 118. Here, a pair of guide units 116 may be disposed at both sides of the guide frame 118.

Further, although not shown in the figure, in the present example embodiment, the sensing part (not shown) may measure the moving distance of the wire w along the longitudinal direction which moves via one of the providing parts 100, 101 and 111. After the measuring, the sensing part may decide whether the winding of the wire w is correct or not, and compensates or corrects the length of the wire w provided by the providing part.

Although not shown in the figure, in the present example embodiment, the sensing part may be disposed at each of an inlet position of the providing part, a central position of the providing part and an outlet position of the providing part, to measure the position of the wire w more correctly.

Here, the sensing part may be a photo sensor, a magnetic sensor and so on.

Accordingly, the sensing part measures or decides whether the wire w is provided to the providing part correctly, whether the wire is moved correctly by the providing part, and whether the wire w is discharged from the providing part correctly. Thus, the moving position of the wire w at every process may be correctly checked and the dislocation, the positioning error, and the moving error of the wire w may be minimized.

Figure 6:
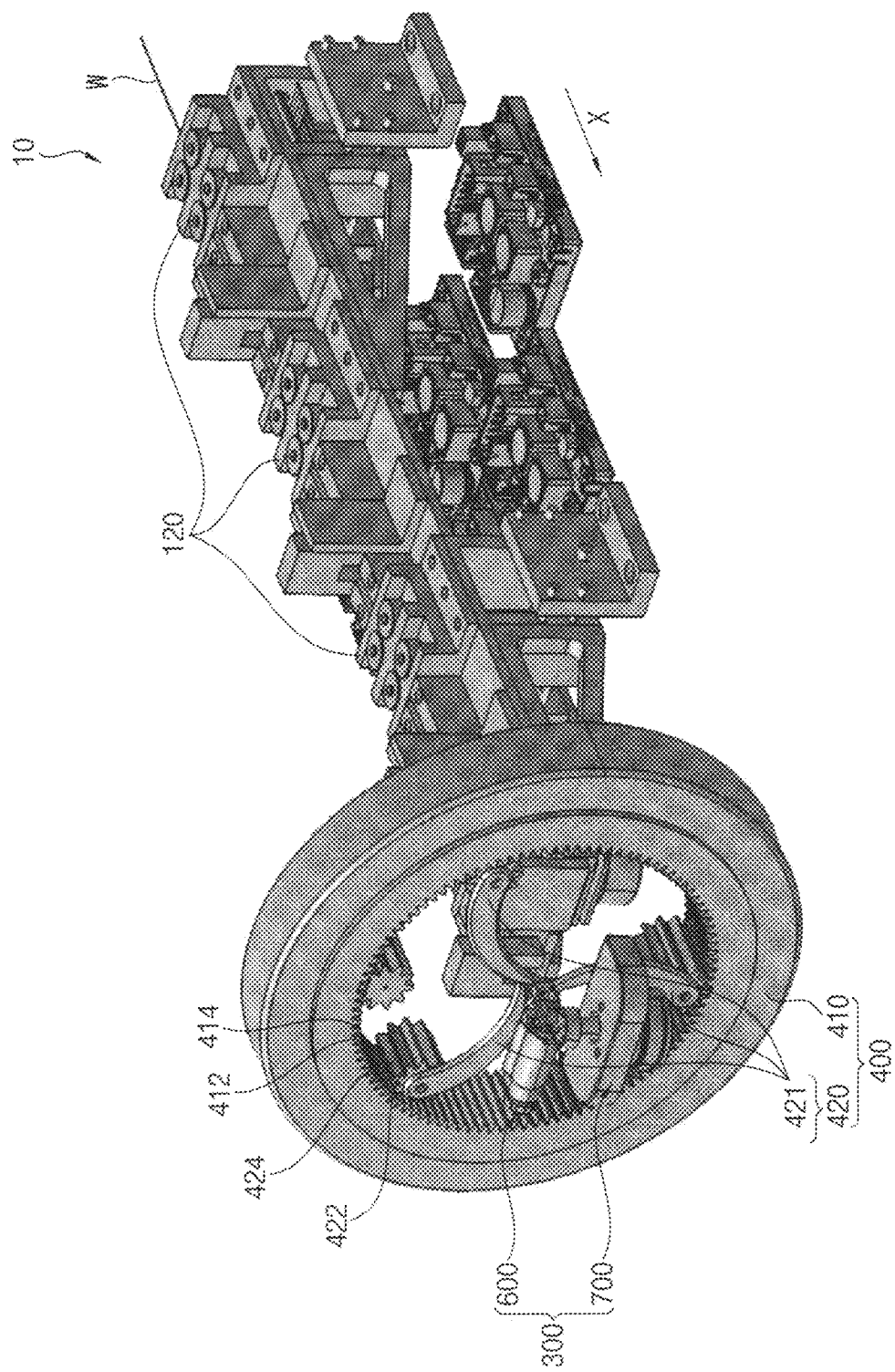
FIG. 6 is a perspective view illustrating an inside of the bending device of FIG. 2.
Figure 7:
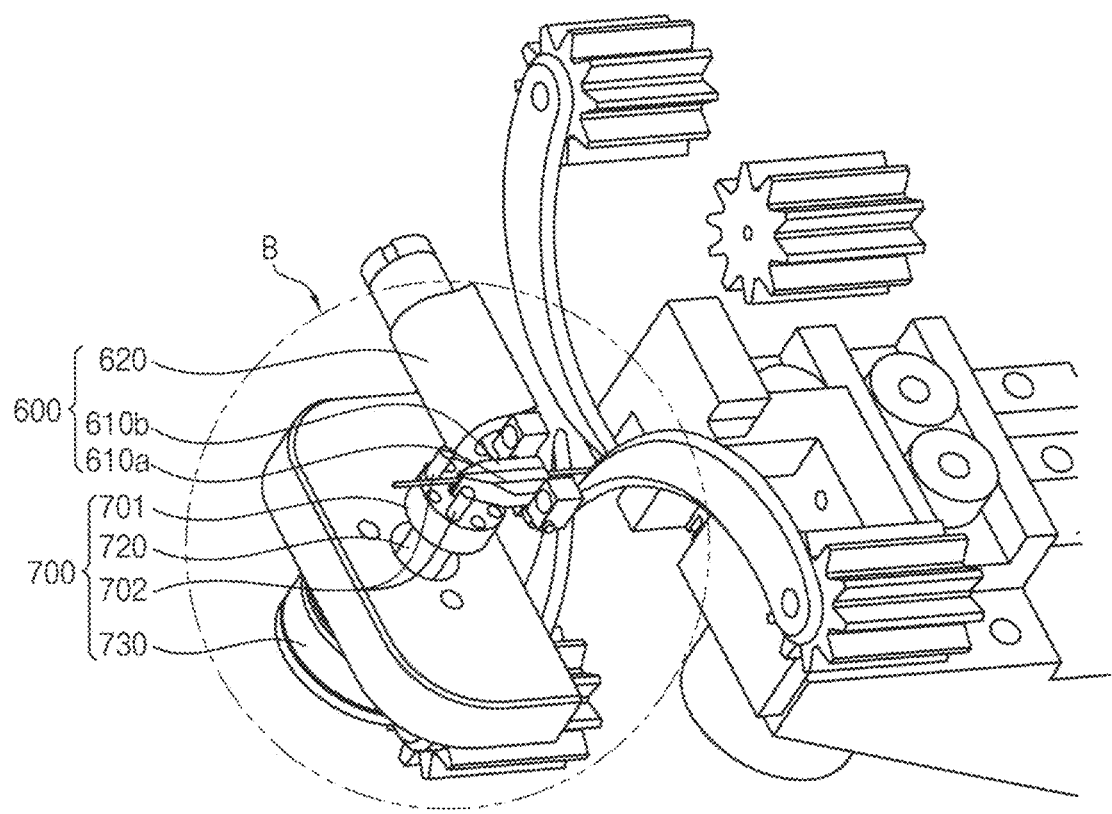
FIG. 7 is an enlarged view illustrating a bending part, a fixing part and a cutting part of the bending device of FIG. 6.
Figure 8:
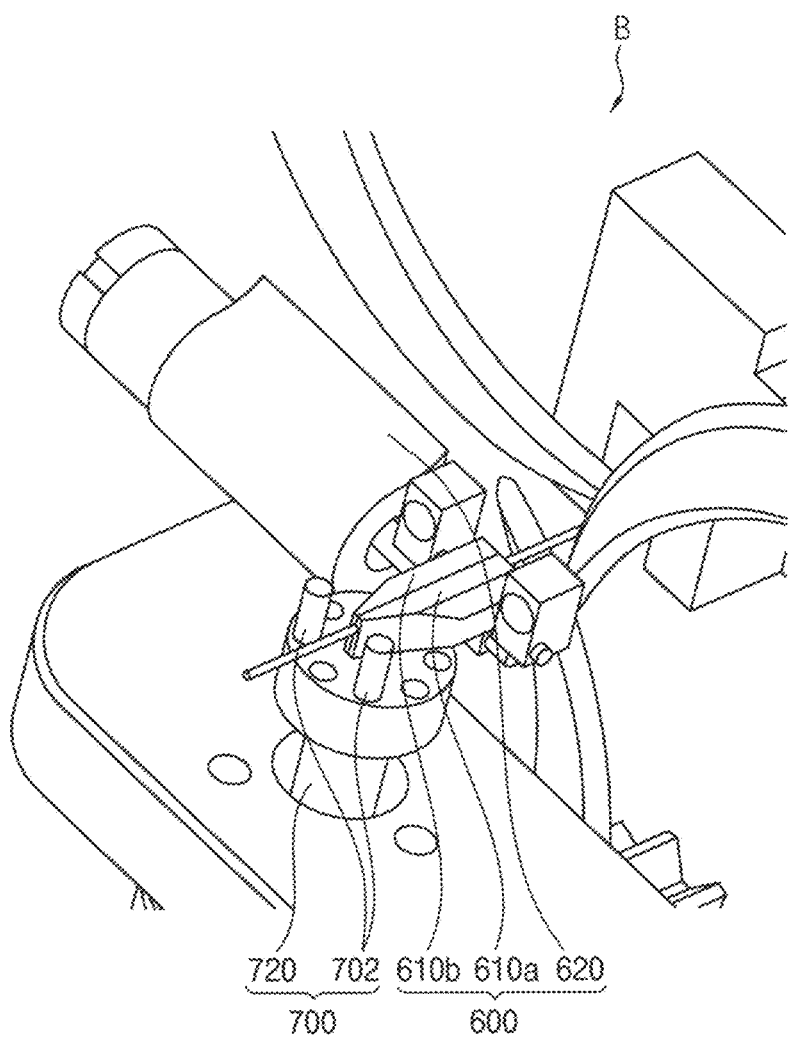
FIG. 8 is an enlarged view illustrating a portion B of the bending device of FIG. 7.

FIG. 6 is a perspective view illustrating an inside of the bending device of FIG. 2. FIG. 7 is an enlarged view illustrating a bending part, a fixing part and a cutting part of the bending device of FIG. 6. FIG. 8 is an enlarged view illustrating a portion B of the bending device of FIG. 7.

Referring to FIG. 6, FIG. 7 and FIG. 8, the fixing part 600 of the bending unit 300 is disposed at a front side of the providing part 100 along a moving direction of the wire w, and fixes the wire w discharged from the providing part 100.

The fixing part 600 includes a fixing jig fixing the wire w and a distance control unit 620.

Here, the fixing jig includes a first jig 610a and a second jig 610b. The first jig 610a and the second jig 610b form a pair, and the wire w is disposed between the first jig 610a and the second jig 610b. The distance control unit 620 moves the first and second jigs 610a and 610b to approach the wire w.

The distance control unit 620 controls the distance between the first and second jigs 610a and 610b. When the wire w is mounted between the first and second jigs 610a and 610b, the distance control unit 620 decreases the distance between the first and second jigs 610a and 610b, so that the first and second jigs 610a and 610b fixes the wire w.

The first and second jigs 610a and 610b approach the wire w, and the distance between the first and second jigs 610a and 610b may be maintained considering the diameter of the wire w.

The distance control unit 620 is automatically controlled, and thus the first and second jigs 610a and 610b grasp the wire w and fix the position of the wire w.

When the wire w is fixed by the first and second jigs 610a and 610b, the bending part 700 of the bending unit 300 bends the wire w within a range between about −180° and about 180° with respect to a direction substantially perpendicular to the X direction.

The bending part 700, as illustrated in FIG. 7 and FIG. 8, includes a base 701, a bending module 702, a bending rotating part 720 and a bending driving part 730.

The base 701 has a circular plate shape having a predetermined thickness, or has a cylindrical shape.

The bending module 702 protrudes from the base 701, and rotates with the rotation of the base 701 to bend the wire w or moves on the base 701 to bend the wire w.

The bending rotating part 720 is equipped to a lower portion of the base 701 and rotates the base 701. The bending driving part 730 provides a driving force to the bending rotating part 720 from a lower portion of the bending rotating part 720, to rotate the bending rotating part 720.

For example, as illustrated in the figure, the bending module 702 may be a pair of bending bars. The pair of bending bars is protruded upwardly from the base 701, and thus the wire w is disposed between the pair of bending bars. Alternatively, the bending module 702 may have various kinds of shapes or structures to bend the wire w effectively.

Here, as the base 100 rotates, the bending rotating part 720 moves the bending module 702 on the base 100 along a circumferential direction, to bend the wire w, and the bending direction of the wire w may be decided by the rotating direction of the bending rotating part 720.

The bending rotating part 720 rotates by a predetermined angle in a clockwise direction or in a counterclockwise direction, within a range between about −180° and about 180°. Thus, the base 701 also rotates by the predetermined angle in a clockwise direction or in a counterclockwise direction, so that the bending angle of the wire w is determined.

Accordingly, the bending rotating part 720 and the base 701 rotate by the predetermined angle within the range between −180° and about 180°, and thus the wire w may be bent variously considering the teeth structure or a structural shape of gingiva in an oral cavity of the patient.

Accordingly, the base 701 and the bending rotating part 720 rotate by the predetermined angle, and thus the wire w is bent by a predetermined angle by the bending module 702.

Here, the bending module 702 applies the force to the wire w along a direction substantially perpendicular to the extending direction of the wire w, for the bending. When the bending module 702 includes the pair of bending bars, the force is applied from a contact surface or point of the wire w with the bending bars.

In addition, considering the amount of the bending or the stiffness of the wire and so on, the bending may be performed repeatedly by the bending module 702.

When the bending of the wire w is finished, the cutting part 400 cuts the wire w by a predetermined length. The cutting part 400 is positioned along the moving direction of the wire w, and in the present example embodiment, as illustrated in FIG. 6, the cutting part 400 may be disposed at a rear side of the fixing part 600.

Referring to FIG. 6 and FIG. 7 again, the cutting part 400 includes a wheel 410, a cutter 420 and a cutting driving part 430. The wheel 410 has saw teeth formed at an inner surface of the wheel 410. The cutter 420 is interlocked with the saw teeth of the wheel 410 and moves along the inner surface of the wheel 410, and thus the cutter 420 cuts the wire w. The cutting driving part 430 rotates the wheel 410.

The cutter 420 includes at least one cutting blade 421 cutting the wire w.

Here, as illustrated in the figure, the cutting blade 421 may be a triple blade cutting the wire w from three directions at the same time. When the cutting blade 421 is the triple blade, each of the cutting blades 421 is combined to a gear wheel 422, and the gear wheel 422 is interlocked with the saw teeth of the wheel 410.

Accordingly, as the wheel 410 rotates, the gear wheel 422 also rotates, and thus the cutting blade 421 approaches the wire w and cuts the wire w at the same time.

As the cutting blade 421 is the triple blade, the wire w receives the force uniformly from three different directions by the triple blade, and thus the wire w may be cut more precisely and correctly.

In the present example embodiment, the wheel 410 having the saw teeth 412 is positioned such that the wire w passes through the wheel 410 along a central portion of the wheel 410, and the cutting blade 421 is easily operated by the rotation of the wheel 410, to cut the wire w. Thus, the driving mechanism is performed with a relatively simple structure and the cutting efficiency may be increased.

Figure 9:
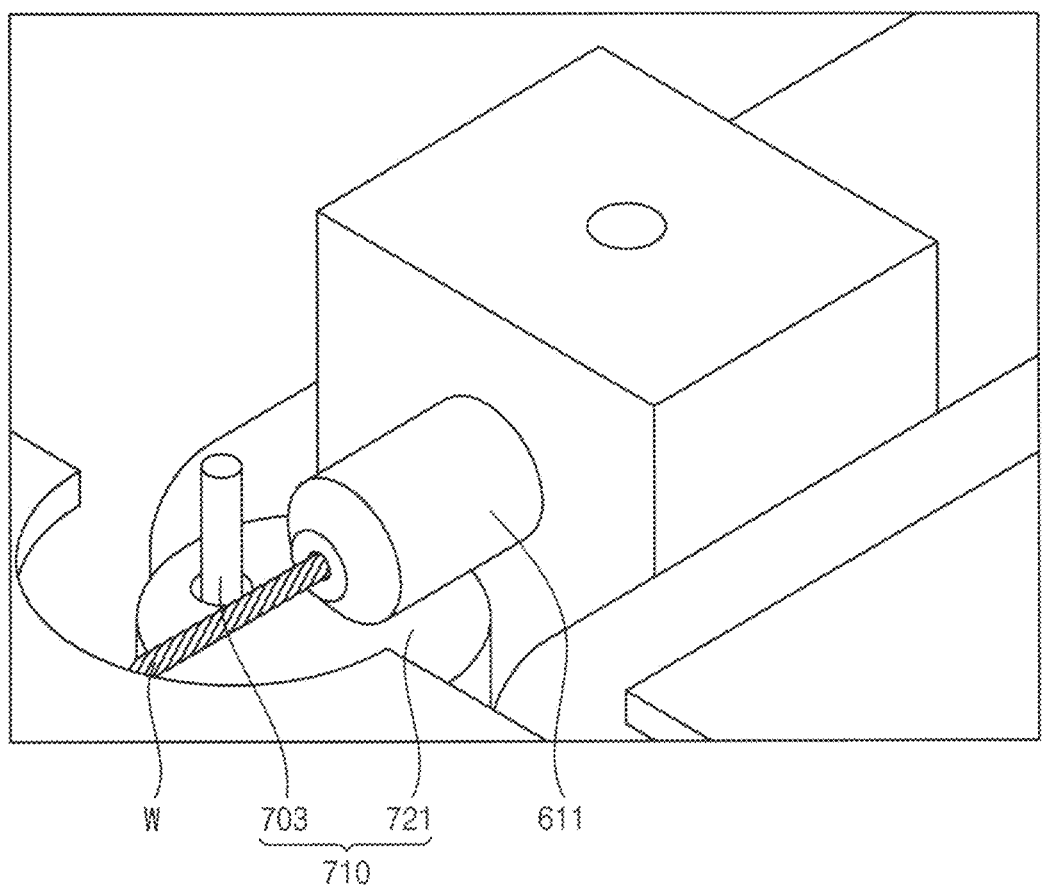
FIG. 9 is an enlarged view illustrating an example of a jig part of the bending device of FIG. 7.

FIG. 9 is an enlarged view illustrating an example of a jig part of the bending device of FIG. 7.

Referring to FIG. 9, in the present example, the fixing part 600 includes a fixing jig 611 fixing the wire w, and the fixing jig 611 has a cylindrical shape having an opening at a central portion of the fixing jig 611. Thus, the wire w passes through the opening of the fixing jig 611 and is fixed to the fixing jig 611.

Thus, the fixing jig is not necessary to include a pair of first and second jigs, and the wire w is simply fixed by the opening of the fixing jig 611.

Here, the bending part 710 includes a bending module 703 and a bending rotating part 721, and the bending rotating part 721 rotates the bending module 703 disposed over the bending rotating part 721, to bend the wire w.

In addition, the bending module 703 extends vertically and upwardly from the bending rotating part 721, and bends the wire w at a side of the wire w.

Figure 10:
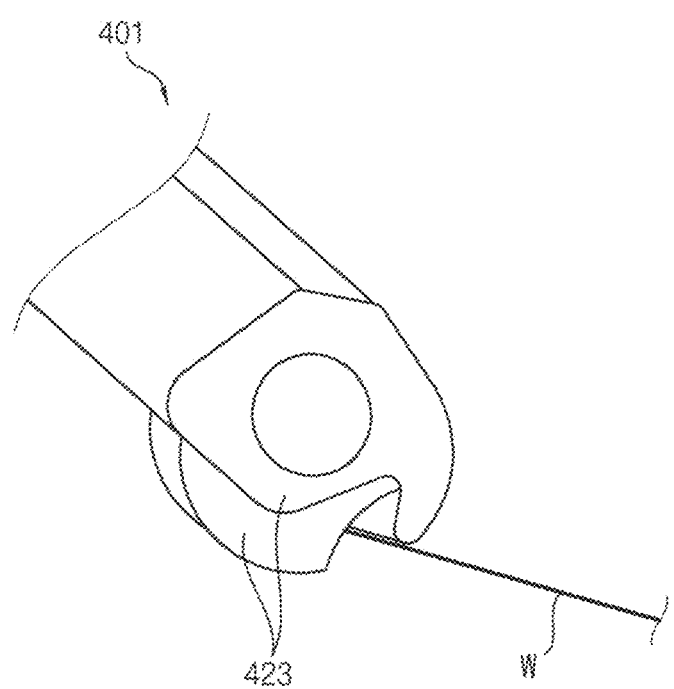
FIG. 10 is a perspective view illustrating an example of a cutting blade of the cutting part of the bending device of FIG. 2.

FIG. 10 is a perspective view illustrating an example of a cutting blade of the cutting part of the bending device of FIG. 2.

Referring to FIG. 10, in the cutting part 401, a cutting blade 423 of the cutter 420 may include a double blade. Here, in the figure, the double blade is merely illustrated as the cutting blade 423, but the driving mechanism of the double blade may be substantially same as that of the triple blade explained referring to FIG. 6 and FIG. 7, and thus repetitive explanation is omitted.

As explained above, when the cutting blade 421 includes the triple blade, a gap may be formed between the wire w and each blade of the triple blade, which means that three blades of the triple blade are positioned differently along the moving direction of the wire w, as illustrated in FIG. 7. Thus, the cutting surface of the wire may be roughly.

In contrast, when the cutting blade 423 includes the double blade, the gap between the wire w and each of the blade of the double blade may be minimized, which means that two blades of the double blade are positioned very closely along the moving direction of the wire w, compared as the triple blade is used. Thus, the cutting surface of the wire may be more smoothly.

Although not shown in the figure, the wire w may be cut by an irradiation of a laser. Here, the cutting part may include a laser cutting unit.

As for the cutting using the triple blade or the double blade, the plurality of blades should make contact with the wire w at the same time, and thus the wire w may be cut uniformly. However, when the wire w has a relatively thinner thickness or a relatively lower strength or stiffness, the cutting using the triple blade or the double blade may be hard to be uniformly.

Thus, using the laser cutting unit, the wire having the relatively thinner thickness or the relatively lower strength or stiffness may be cut more easily, more precisely and more uniformly without deformation.

Figure 11:
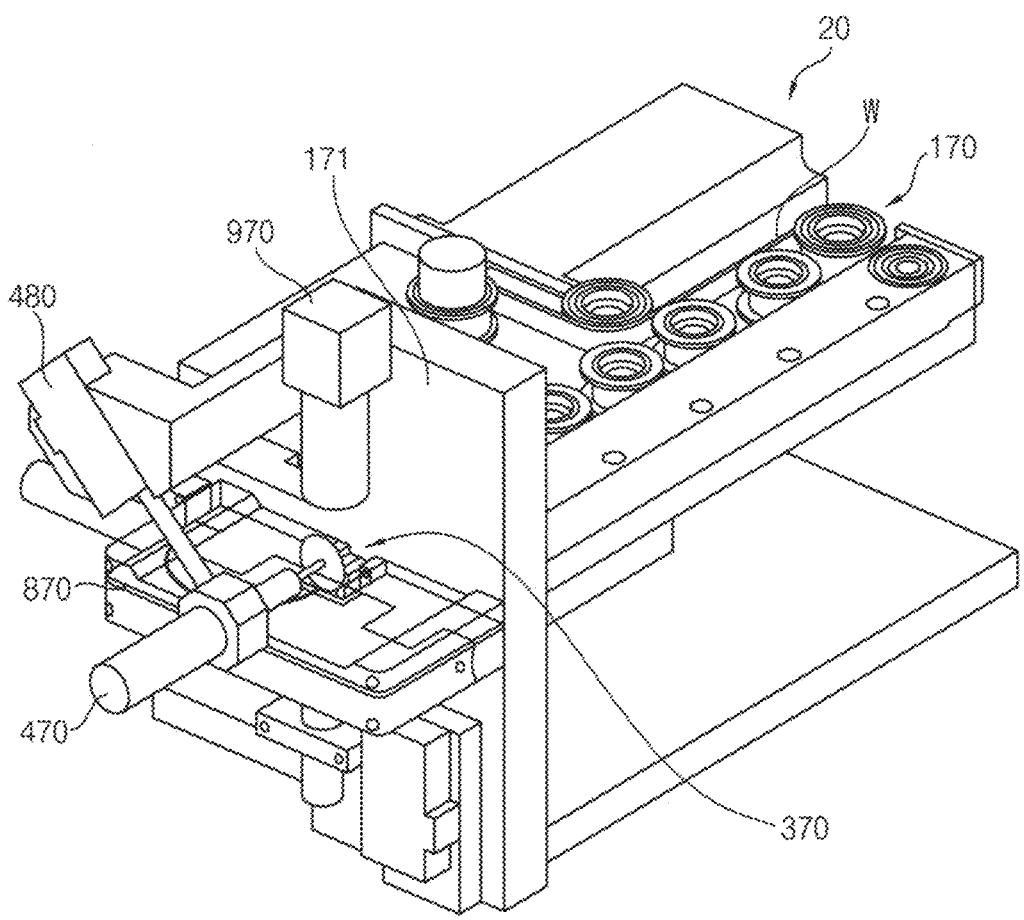
FIG. 11 is a perspective view illustrating an orthodontic wire bending device according to another example embodiment of the present invention.
Figure 12:
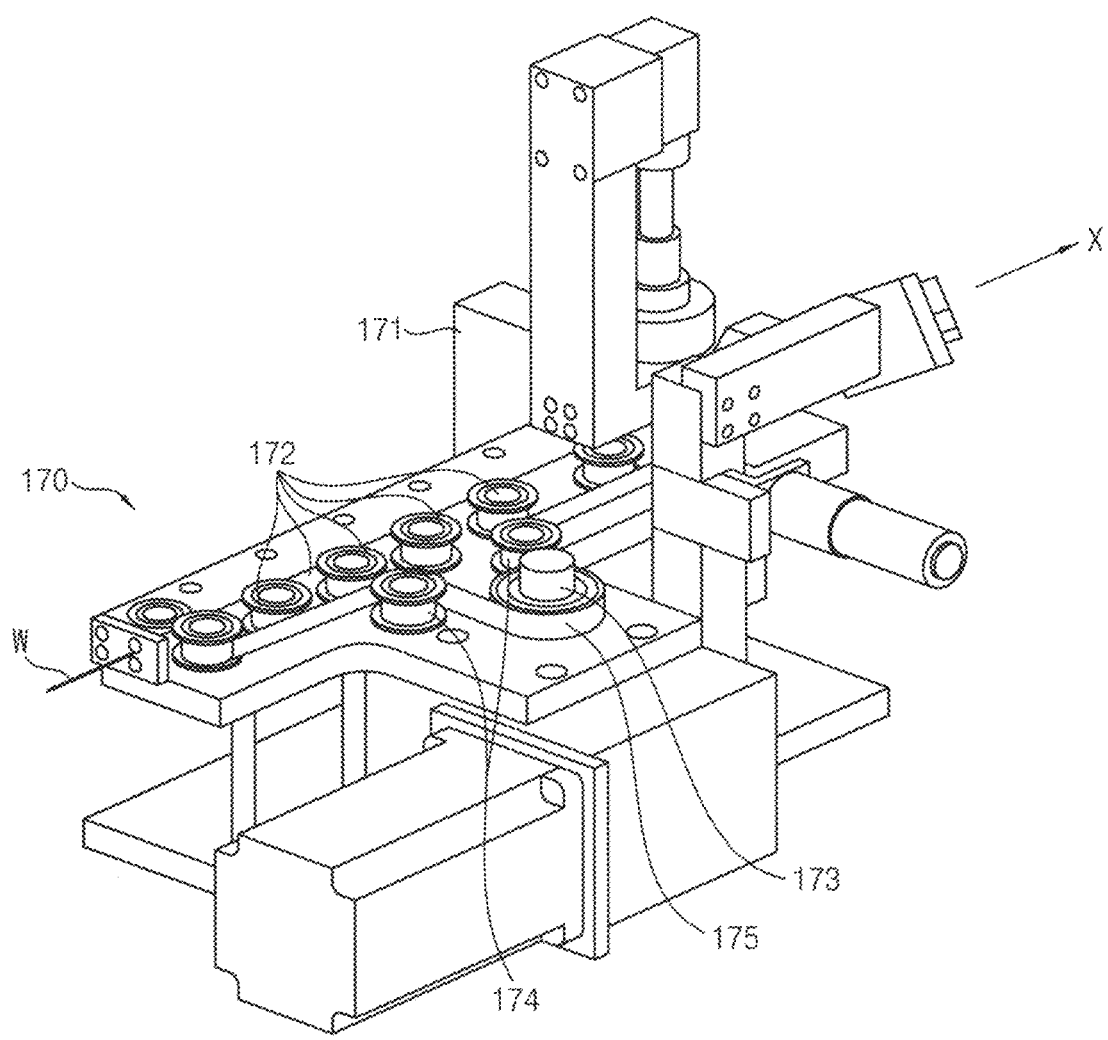
FIG. 12 is a perspective view illustrating the bending device of FIG. 11, with a different view.
Figure 13:
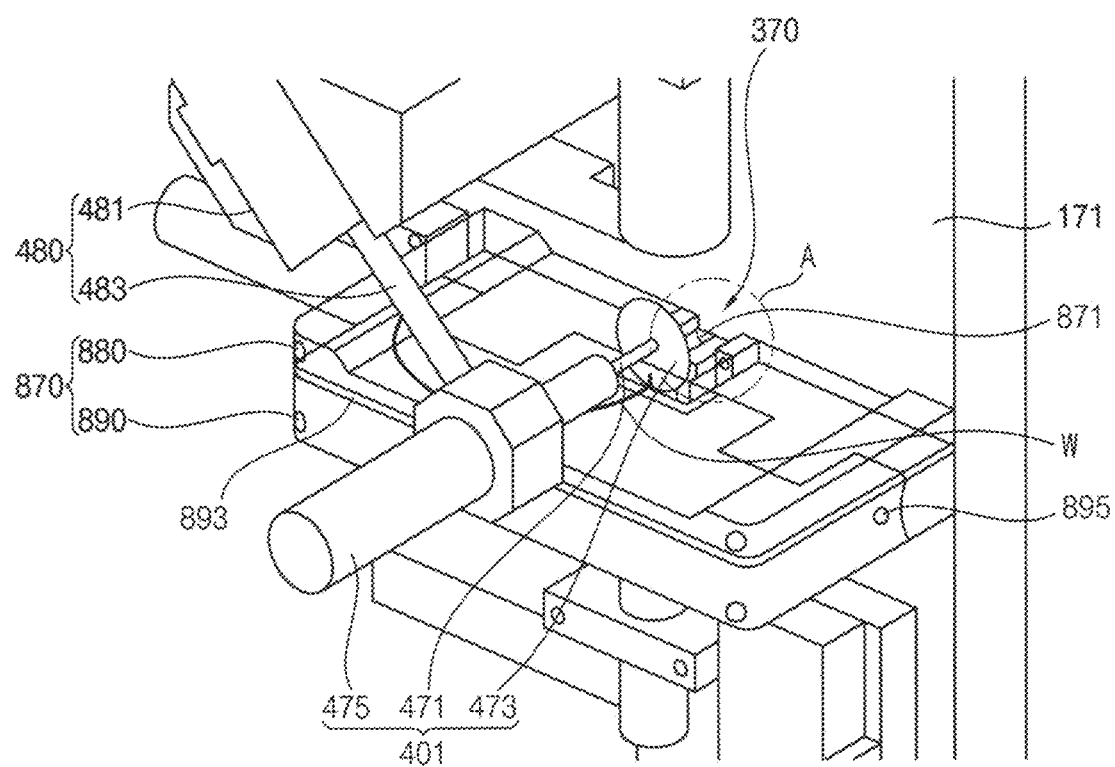
FIG. 13, FIG. 14 and FIG. 15 are enlarged views illustrating a bending unit, a cutting part, a guide jig part and so on of the bending device FIG. 11.
Figure 14:
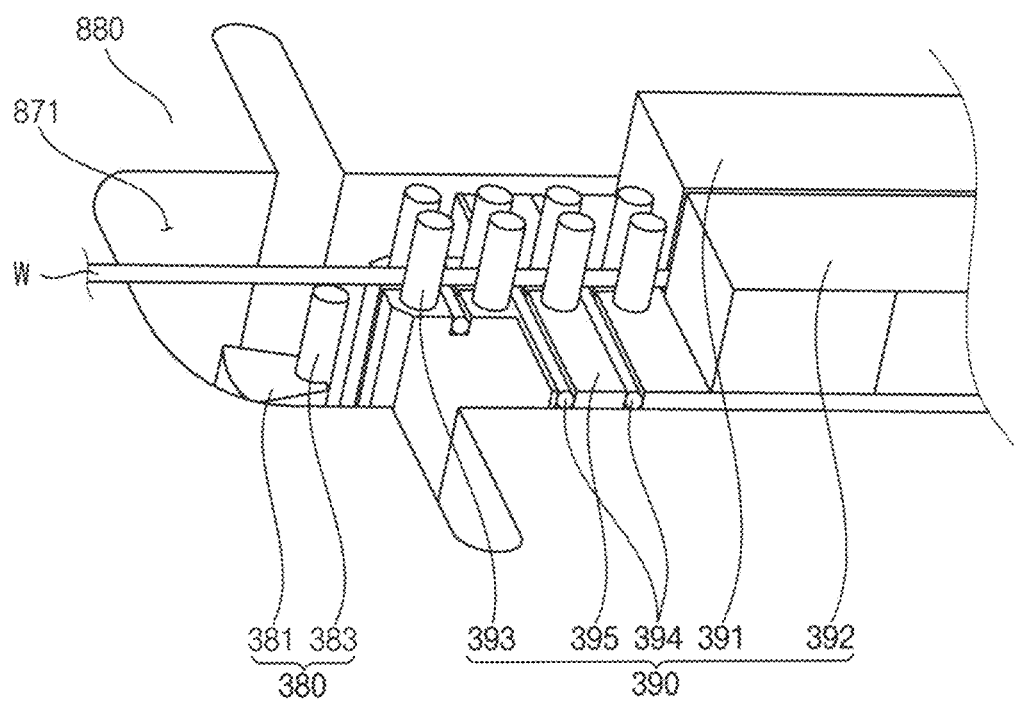
Figure 15:
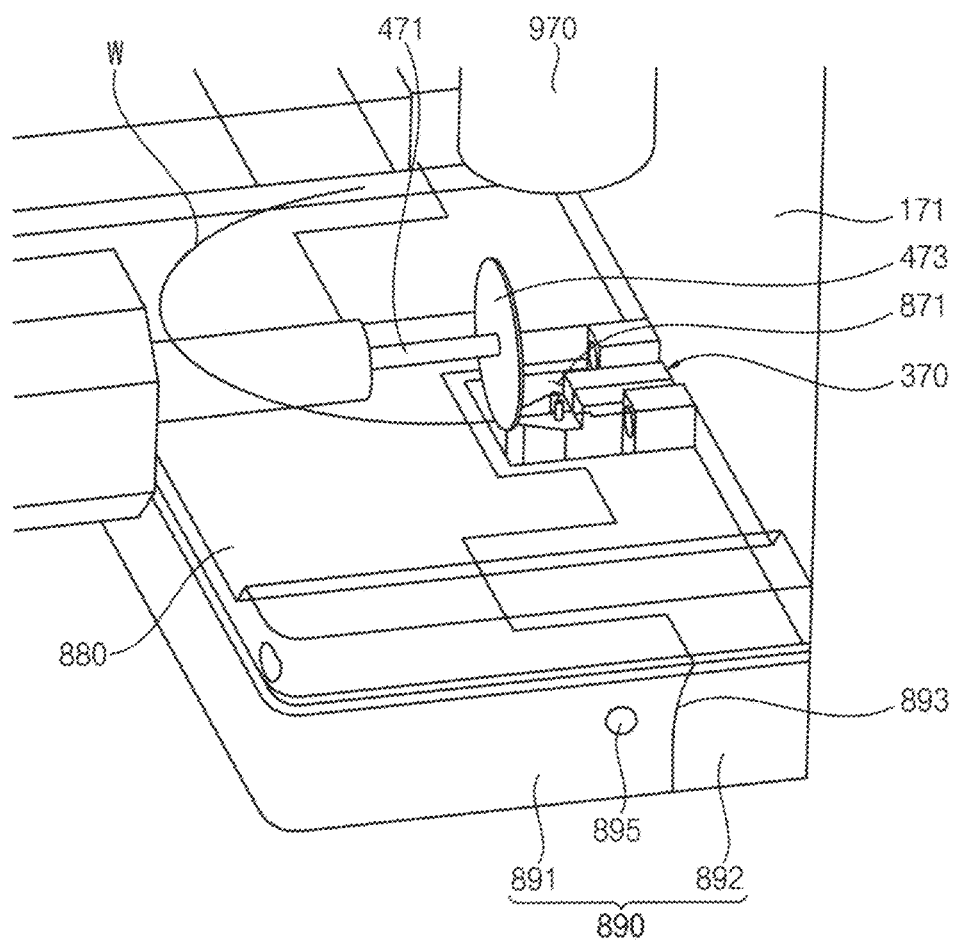

FIG. 11 is a perspective view illustrating an orthodontic wire bending device according to another example embodiment of the present invention. FIG. 12 is a perspective view illustrating the bending device of FIG. 11, with a different view. FIG. 13, FIG. 14 and FIG. 15 are enlarged views illustrating a bending unit, a cutting part, a guide jig part and so on of the bending device FIG. 11.

Referring to FIG. 11, FIG. 12, FIG. 13, FIG. 14 and FIG. 15, the bending device 20 according to the present example embodiment includes a providing part 170, a bending unit 370, a cutting part 401, a linear moving part 480, a guide jig part 870 and a vision part 970.

In the present example embodiment, the providing part 170 includes a guide roller 172, a driving roller 173, a reversing roller 174 and a belt 175, and thus provides the wire w through a side wall 171.

A plurality of guide rollers 172 may extend in a line along the X direction, and as explained above, the guide roller 172 has a guiding groove formed along a circumferential direction of the guide roller 172. Thus, the wire w is inserted into the guiding groove, and is guided by the guide roller 172.

In the present example embodiment, the guide rollers 172 are not driven by an external force and are merely rotated in place. The guide rollers 172 receive the rotating force via the bel 175.

The guide rollers 172 are connected to the driving roller 173 which is spaced apart from the guide rollers 172, via the belt 175. The reversing roller 174 changing the direction of the belt 175 is disposed adjacent to the driving roller 731.

Here, the position, the arrangement and the number of the driving roller 173 and the reversing roller 174 may be changed variously.

Thus, as the rotating force is generated in the driving roller 173, the belt 175 transmits the rotating force to the guide rollers 172, and thus guide rollers 172 rotate in place.

Thus, the wire w inserted at the guiding groove of the guide rollers 172 moves along the X direction.

Although not shown in the figure, the providing part 170 has a taper shape formed at an inlet of the providing part 170 through which the wire w is inserted, and thus the wire w is inserted to the providing part 170 more easily.

Further, although not shown in the figure, the sensing part (not shown) may be further included. Using the sensing part, the moving distance of the wire w moving along the longitudinal direction by the providing part 170 is measured, so that the winding error of the wire w may be decided and the length of the wire w provided by the providing part 170 may be corrected or compensated.

Accordingly, the wire w moves via the guide rollers 172 and passes through the side wall 171, and then the wire w is provided to the bending unit 370 which is disposed at a front side of the side wall 171.

Referring to FIG. 14, the bending unit 370 includes a fixing part 390 and a bending part 380.

The fixing part 390 is disposed at a front side of the providing part 170 along the moving direction of the wire w, in other words, at the front side of the side wall 171, and fixes the wire w provided by the providing part 170.

The fixing part 390 includes first and second jigs 391 and 392, a distance control unit (not shown), a pair of fixing tips 393, a fixing plate 395 and a guide pin 394.

The first and second jigs 391 and 392 are disposed to face each other, and the wire w is disposed between the first and second jigs 391 and 392. The first and second jigs 391 and 392 guide the discharge of the wire w.

The wire w is disposed between the pair of fixing tips 393, and the pair of fixing tips 393 is disposed between the first and second jigs 391 and 392 and the bending bars explained below. Here, the pair of fixing tips 393 is disposed at a front side of the first and second jigs 391 and 392, and fixes the wire w.

In addition, at least two pairs of fixing tips 393 may be arranged, and the pair of fixing tips 393 is arranged such that the wire w is disposed between each of the pair of fixing tips 393, and thus each of the pair of fixing tips 393 makes contact with each sides of the wires to fix the wire more uniformly and more tightly.

When at least two pairs of fixing tips 393 is arranged as illustrated in FIG. 14, the pair of fixing tips disposed closest to the bending bar becomes the rotational center of the bending of the wire w.

Although not shown in the figure, the fixing part 390 may further include the distance control unit (not shown). The distance control unit moves the first and second jigs 391 and 392, so that the first and second jigs 391 and 392 approach the wire w.

Further, as the fixing tip 393 has a cylindrical shape, the cross-sectional shape of the fixing tip 393 is a circular shape. Thus, as the wire w is discharged with passing through the pair of the fixing tips 393, the wire w is rarely interfered by the fixing tip 393 and the wire w is smoothly discharged.

The distance control unit controls the distance between the first jig 391 and the second jig 392. As the wire w is mounted between the first jig 391 and the second jig 392, the distance between the first and second jigs 391 and 392 may be decreased by the distance control unit.

The first and second jigs 391 and 392 approach the wire w and the distance between the first and second jigs 391 and 392 is controlled to be substantially same as the diameter of the wire w, and thus the wire w may be fixed and grasped by the first and second jigs 391 and 392.

Here, the distance control unit may be automatically controlled, so that the first and second jigs 391 and 392 grasp the wire w and fix the position of the wire w.

The fixing plate 395, as illustrated in the figure, may include a plate shape. The pair of fixing tips is positioned on the fixing plate 395, and the wire w is supported by the fixing plate 395. Here, the fixing plate 395 prevents the wire w from being deviated between the first and second jigs 391 and 392, and also prevents the wire w from moving downwardly or sagging.

In addition, a groove (not shown) is formed at an upper surface of the fixing plate 395, and the groove extends substantially perpendicular to the moving direction of the wire w. The guide pin 394 is inserted into the groove.

Here, the guide pin 394 has a cylindrical rod shape, and extends substantially perpendicular to the moving direction of the wire w. Thus, while the wire w moves on the fixing plate 395 with making contact with the fixing plate 395, the wire w partially makes contact with the guide pin 394 and thus the wire w may move more smoothly without interfered by the fixing plate 395. Here, the guide pin 394 may minimize the frictional force between the wire w and the fixing plate 395.

The number of the guide pines 394 may be variously changed.

Here, the guide pin 394 may rotate with respect to the fixing plate 395 with inserted into the groove, and thus, the wire w may move or be discharged more easily with the rotation of the guide pin 394.

Further, with fixing the wire w using the first and second jigs 391 and 392, the bending part 380 of the bending unit 370 bends the wire w along a predetermined direction. Here, the bending direction, the amount of the bending and so on may be predetermined considering the teeth arrangement of the patient, the purpose of the orthodontic treatment for the patient and so on, and based on the above, the bending part 380 bends the wire w.

The bending of the wire w may be performed by the bending part 380 right after the wire w is discharged, and thus the bending portion of the wire w moves and advances toward a front side of the first and second jigs 391 and 392.

Here, the bending part 380 includes a base 381 and a bending bar 383.

The base 381 has a circular plate shape having a predetermined thickness, in other words, a cylindrical shape.

The bending bar 383 moves along a circumferential direction of the base 381 with protruded from the base 381, and bends the wire w.

Here, the bending bar 383 is disposed at a first side of the wire w, and bends the wire w along a first direction. When the wire w is needed to be bent along a second direction opposite to the first direction, the bending bar 383 should be disposed at a second side of the wire w opposite to the first side.

To locate the bending bar 383 in the opposite side, in other word, to change to position of the bending bar 383 from the first side to the second side, the bending bar 383 performs a z-motion (vertical motion). For example, the bending bar 383 protruded from the base 381, performs the z-motion to be inserted into a hole h of the base 381, and then the bending bar 383 rotates as the base 381 rotates so that the bending bar 383 is located at the opposite side. Then, the bending bar 383 inserted into the hole, performs the z-motion again to be protruded from the base 381.

Accordingly, the bending bar 383 performs the z-motion in which the bending bar 383 protrudes from the base 381 and is inserted into the base 381, and thus the bending bar 383 may be located at each of both sides of the wire w. Thus, only the single bending bar 383 may bend the wire w along each of both directions.

Here, the wire w is not interfered by the bending bar 383 when the wire w is bent, and thus the wire w may be bent more widely or with more increased angle, without limiting the bending angle due to the bending bar. Thus, the wire w may be bent with various kinds of angles.

Further, as the wire w moves or advances, the bending bar 383 may be disposed forwardly or backwardly considering the position of the wire w. Thus, when the wire w is rotated or bent by the bending bar 383, the center of the rotation or the center of the bending may be changed.

For example, when the bending bar 383 is disposed close to the fixing tips 393 of the fixing part 390 and the wire w is bent, the center of the rotation of the wire w is close to the fixing tips 393. In contrast, when the bending bar 383 is disposed away from the fixing tips 393 and the wire w is bent, the center of the rotation of the wire w is also away from the fixing tips 393.

Then, after the bending is finished by the bending part, the wire w is cut.

The cutting part 401 moves via the linear moving part 480, and as illustrated in the figure, the cutting part 401 move toward the wire w and then cuts the wire w. After cutting the wire w, the linear moving part 480 moves the cutting part 401 away from the wire w.

For example, referring to FIG. 13 and FIG. 15, the linear moving part 480 includes a linear motor 481 and a combining member 483, and the cutting part 401 includes a rotating axis 471, a cutter 473 and a body 475.

The linear motor 481 provides a linear moving force. The combining member 483 is combined with the cutting part 401 to transmit the linear moving force to the cutting part 401. Here, as illustrated in the figure, the combining member 483 extends along a diagonal direction, and thus the combining member 483 moves the cutting part 401 linearly along the diagonal direction.

The linear motor 481 moves the cutting part 401 along the diagonal direction with respect to the guide jig part 870, so that the cutting part 401 approaches the wire w or the cutting part 401 moves away from the wire w. Accordingly, the cutting part 401 moves along the diagonal direction, so that the cutting part 401 may be prevented from being interfered with the vision part 970, even though the vision part 970 monitoring the cutting is disposed vertically over the guide groove 871.

The cutter 473 has a circular plate shape and the cutting blade is formed at an outer surface of the cutter 473. The cutter 473 rotates with respect to the rotating axis 471, to cut the wire w. The body 475 provides the rotating force to the rotating axis 471, and a side of the body 475 is combined with the combining member 483 to receive the linear moving force from the combining member 483.

Here, the cutter 473, for example, may rotate like a grinder to cut the wire w.

Accordingly, the cutting part 401 moves along the diagonal direction with respect to the guide jig part 870 via the linear moving part 480, and thus the cutting part 401 approaches the wire w for the cutting and moves away from the wire w after the cutting. Thus, the cutting part 401 minimizes or prevents the interference of the bending of the wire w.

The guide jig part 870 is disposed at a front side of the providing part 170, and extends with a plate shape along the moving direction of the wire w. Here, the guide jig part 870 includes a guide groove 871, and an upper jig 880 and a lower jig 890 overlapping with each other.

The upper and lower jigs 880 and 890 extend vertically from the side wall 171 of the providing unit 170. The guide groove 871 is a space between the side wall 171 and the upper and lower jigs 880 and 890, and the bending unit 370 is disposed at the guide groove 871. Accordingly, as the guide groove 871 is formed as mentioned above, the cutter 473 is positioned at an inner side of the guide groove 871 and then cuts the wire w, if the cutting is necessary.

In addition, the upper jig 880 and the lower jig 890 overlap with each other to form a predetermined gap, and thus the wire w bent by the bending unit 370 extends toward the gap and is fixed between the upper and lower jigs 880 and 890.

Accordingly, as the wire w is continuously bent and moved, the bent portions of the wire w are fixed between the upper and lower jigs 880 and 890. Thus, in the following bending processes, the bent portions are prevented from being bent downwardly or sagging downwardly and the shape of the bent portions of the wire w is uniformly and correctly maintained.

The lower jig 890 includes a first lower plate 891 and a second lower plate 892, and the first lower plate 891 and the second lower plate 892 are detachable combined with each other with respect to a boundary surface 893.

Here, the first and second lower plates 891 and 892 are combined and connected by a rotating member 895 which is formed to pass through the first lower plate 891 and is disposed close to the boundary surface 893.

With the second lower plate 892 fixed to the side wall 171, the first lower plate 891 rotates with respect to the second lower plate 892 via the rotating member 895. When the first lower plate 891 rotates as mentioned above, the first lower plate 891 is detached from the second lower plate 892 with respect to the boundary surface 893, and thus the wire w fixed between the upper and lower jigs 880 and 890 drops or moves downwardly.

Then, after the bending, the wire w may be stored in an additional tray or storage disposed downwardly, and then the wire w may be collected externally.

The upper jig 880 has a transparent material, and the lower jig 890 has an opaque material. Thus, the bent wire w extending between the upper and lower jigs 880 and 890 may be recognized by a naked eye.

The vision part 970 is disposed over the upper jig 880, and recognizes whether the wire w is bent with a predetermined design or shape through the transparent upper jig 880. If not, the bending unit 370 is controlled to bend the wire w with the predetermined design or shape.

Further, the vision part 970 measures the amount of the bending, the bending angle and so on, and then transmits the measured information to an outer control system (not shown). Thus, the bending may be controlled and any further bending or processes may be performed.

Although not shown in the figure, the bending device 20 according to the present example embodiment may further include a laser heater. The laser heater may be disposed over the bending unit 370, and disposed at the guide groove 871. The laser heater may irradiate a laser to melt the wire w locally. The melting is locally performed at the bent portion of the wire w, and thus the wire w may be bent more easily.

Here, the laser is irradiated such that the shape of the wire w is maintained, which means that the wire w is not plastically deformed, and thus the locally melted wire w may be bent more correctly or more easily by the bending unit 370.

The wire w is an orthodontic wire, and strength or stiffness of the wire is relatively high, and thus the bending may be performed repeatedly for a single bending position of the wire w. Thus, as the laser is irradiated to the local position of the wire w and the position of the wire is melted, the strength or the stiffness of the wire w at the irradiated position may be decreased. Thus, the number of bending may be decreased or only one number of bending may complete the predetermined or predesigned bending for the wire w. Accordingly, the bending process may be more simplified and more correctly.

According to the present example embodiments, at least one providing unit of the providing part is arranged in a line, to move the wire intermittently along a longitudinal direction by a predetermined distance, so that the wire may be moved uniformly in a line.

In addition, the guiding groove is formed around the guide roller and the wire is mounted at the guiding groove, so that the wire may be moved stably and safely with maintaining the position of the wire.

Alternatively, the guide roller may move the wire by a driving force from the belt, so that the wire may be stably provided with a relatively simple driving mechanism.

Further, as the wire is provided with the first fixing unit sliding in the guide unit, a relatively longer wire may be stably provided. Here, the wire from outside is stably mounted by the second fixing unit at the predetermined position, and thus the position of the wire is correctly maintained and thus the wire may be continuously provided without any problem.

In addition, when the cutter of the cutting part has a triple blade, the wire may be cut from three directions at the same time, so that the wire receives a cutting force uniformly from three directions. Thus, the wire may be arranged or positioned more uniformly and be cut more precisely and more correctly, compared to the case that one directional cutting force is applied to the wire.

Alternatively, when the cutter has a double blade, the double blade heading the wire extends along the same direction, so that the gap between the blades may be minimized and a cutting surface of the wire may be more smoothly.

Here, the cutting part is designed so as to drive the cutter as the driving of the wheel, so that each blade of the triple blade or the double blade receives the cutting force uniformly. Thus, the wire may be cut more stably and smoothly.

Alternatively, when the laser is used for the cutting, the wire may be cute more precisely and more correctly.

Alternatively, the cutting part and the linear moving part are combined with each other, to move the cutting part by the linear moving part, so that the cutting part moves toward the wire for the wire cutting and the cutting part moves away from the wire after the cutting. Thus, the following bending process may not be interfered by the cutting part.

In addition, the upper jig and the lower jig overlapping with each other with a predetermined gap, are disposed, so that the bended portion of the wire may be fixed between the upper jig and the lower jig. Thus, during the wire bending process, the wire is prevented from sagging downwardly, and the wire is maintained to be bended stably.

In addition, the lower jig includes the first and second lower plates rotatably combined with each other, and thus the first lower plate is rotated with respect to the second lower plate after the bending, to move the wire downwardly.

Further, the upper jig has a transparent material and the lower jig has an opaque material, so that the bended wire extending between the upper and lower jigs is recognized by a naked eye. Thus, the moving or the bending of the wire may be easily controlled.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A bending device comprising:
    a providing part configured to provide a wire;
    a bending unit disposed at a front side of the providing part, and comprising a fixing part and a bending part, the fixing part being configured to fix the wire, the bending part being configured to bend the wire fixed by the fixing part;
    a cutting part configured to cut the wire bent by the bending part; and
    a guide jig part having an upper jig and a lower jig opposite to the upper jig in a direction crossing a moving direction of the wire from the providing part toward the bending unit,
    wherein
    the bending part comprises a bending module, and the bending module is rotated along a circumferential direction or moves along a direction different from the circumferential direction to make contact with at least one side of the wire for bending the wire, and
    each of the upper jig and the lower jig has a plate shape extending in the moving direction of the wire to sandwich the wire bent by the bending unit.

2. The bending device of claim 1, wherein the providing part comprises at least one providing unit having a plurality of guide rollers, and the guide rollers are configured to guide the wire to move in the moving direction.

3. The bending device of claim 2, wherein a guiding groove is formed at each of the guide rollers to guide the wire, and the guiding groove is formed to be concaved along a circumferential direction of each of the guide rollers.

4. The bending device of claim 2, wherein the providing part comprises:
    a belt configured to be driven in the guiding rollers to provide a driving force to the guiding rollers; and
    a driving roller configured to provide a driving force to the belt.

5. The bending device of claim 1, wherein the providing part comprises a first fixing unit configured to fix the wire, and a guide unit in which the first fixing unit is slid, wherein the wire is provided according to the sliding of the first fixing unit.

6. The bending device of claim 5, wherein the providing part further comprises:
    a second fixing unit disposed at a rear side of the first fixing unit, to position the wire from outside to a predetermined position; and
    a guide frame configured to fix the guide unit.

7. The bending device of claim 6, wherein the second fixing unit comprises a rotating part configured to move the wire from the predetermined position toward the first fixing unit.

8. The bending device of claim 1, wherein the cutting part comprises a cutter disposed at a front side or a rear side of the fixing part and having at least one cutting blade.

9. The bending device of claim 8, wherein the cutting blade is a triple blade configured for cutting the wire from three directions at the same time, or a double blade configured for cutting the wire from two directions at the same time.

10. The bending device of claim 8, wherein the cutting part further comprises:
    a wheel having saw teeth formed at an inner surface of the wheel; and
    a cutting driving part configured to rotate the wheel,
    wherein the cutting part is configured to rotate along the inner surface of the wheel to cut the wire.

11. The bending device of claim 1, wherein the cutting part is configured to irradiate a laser to the wire to cut the wire.

12. The bending device of claim 8, further comprising:
    a linear moving part having a combining member connected to the cutting part, to move the cutting part toward the wire,
    wherein the combining member is connected to the cutting part along a diagonal direction, and the cutting part is configured to move toward the wire along the diagonal direction.

13. The bending device of claim 1,
    wherein the upper jig and the lower jig overlap with each other by a predetermined gap to allow the wire bent by the bending unit to be fixed and extend in the predetermined gap between the upper jig and the lower jig.

14. The bending device of claim 13, wherein a guide groove is formed at the upper jig and the lower jig, and the bending unit and the cutter of the cutting part are disposed at the guide groove.

15. The bending device of claim 13, wherein the lower jig comprises a first lower plate and a second lower plate detachably combined with each other with respect to a boundary surface,
    wherein the first lower plate rotates with respect to the second lower plate, to move the wire fixed between the upper jig and the lower jig downwardly in a direction crossing the moving direction of the wire.

16. The bending device of claim 13, wherein the upper jig has a transparent material, and a vision part is disposed over the upper jig to monitor the wire through the upper jig.

17. The bending device of claim 1, wherein the fixing part comprises:
    a fixing jig configured to fix the wire; and
    at least a pair of fixing tips arranged in a line to fix the wire when the wire passes through and is discharged from the fixing Jig.

18. The bending device of claim 17, wherein the fixing part further comprises:

a guide pin disposed under the wire, extending a direction substantially perpendicular to a discharged direction of the wire, and making contact with the wire.

19. The bending device of claim 1, wherein the bending part comprises a base and a bending bar, wherein the bending bar is protruded from the base and is positioned at both sides of the wire for bending the wire, wherein the bending bar is selectively disposed at one of both sides of the wire, via a z-motion.

20. The bending device of claim 19, wherein the bending bar moves forward or backward along the moving direction of the wire, to change a rotational center of the wire.

\* \* \* \* \*